(12) United States Patent
Schrödinger

(10) Patent No.: US 7,489,877 B2
(45) Date of Patent: Feb. 10, 2009

(54) OPTICAL TRANSMISSION MODULE

(75) Inventor: Karl Schrödinger, Berlin (DE)

(73) Assignee: Infineon Technologies Fiber Optics GmbH, Wernerwerkdamm 16, Berlin (DE)

( * ) Notice: Subject to any disclaimer, the term of this patent is extended or adjusted under 35 U.S.C. 154(b) by 565 days.

(21) Appl. No.: 10/849,198

(22) Filed: May 19, 2004

(65) Prior Publication Data

US 2005/0259995 A1    Nov. 24, 2005

(51) Int. Cl.
*H04B 10/00*    (2006.01)
(52) U.S. Cl. ........................ 398/182; 398/192
(58) Field of Classification Search ......... 398/135–139, 398/182–201
See application file for complete search history.

(56) References Cited

U.S. PATENT DOCUMENTS 6,038,407 A    3/2000 Ito et al.
6,178,023 B1    1/2001 Nava et al.
6,512,617 B1 *  1/2003 Tanji et al. ................. 398/137

FOREIGN PATENT DOCUMENTS

EP             0 735 705 A1    10/1996
WO     WO 03/058827 A2         7/2003

* cited by examiner

*Primary Examiner*—Agustin Bello

(57) ABSTRACT

According to the invention, an optical transmission module includes a transmission element, and a driver which drives the transmission element. The driver uses a transmission signal that is applied to its driver input to produce a drive signal for the transmission element. The transmission module furthermore has a control device which drives the driver, and which furthermore, is programmable. A multiplexing device is connected between a signal input of the optical transmission module, the driver input of the driver and the control device, and can be used to switch an input signal, which is applied to the signal input of the transmission module, to the control device or to the driver.

12 Claims, 6 Drawing Sheets

OPTICAL TRANSMISSION MODULE

FIELD OF THE INVENTION

The invention relates to an optical transmission module, in particular for optical data transmission systems.

SUMMARY OF THE INVENTION

According to one aspect of the invention, an optical transmission module is disclosed having a transmission element, and a driver which drives the transmission element. The driver uses a transmission signal that is applied to its driver input to produce a drive or modulation signal for the transmission element. The transmission module according to the invention furthermore has a control device which drives the driver, and which furthermore, is programmable. A multiplexing device is connected between a signal input of the optical transmission module, the driver input of the driver and the control device, and can be used to switch an input signal, which is applied to the signal input of the transmission module, to the control device or to the driver.

One major advantage of the optical transmission module according to the invention is that it requires only a very small number of external connecting pins, specifically because the signal input of the transmission module is used in a duplicated form: firstly, the transmission signal for the driver and for the transmission element can be fed in via the signal input of the transmission module; secondly, however, it is also possible to transmit programming signals to the control device via the signal input of the transmission module, specifically because the multiplexing device makes it possible to alternatively produce a connection between the signal input of the transmission module and of the control device. There is therefore no need for a separate connection for programming signals.

In summary, the optical transmission module according to the invention thus results, despite the "capability to program" the control device, in a transmission module requiring only a very small number of connections or connecting pins since the signal input of the transmission module can be used not only for feeding in the transmission signals but also for feeding in programming signals.

According to one particularly advantageous embodiment of the optical transmission module according to the invention, provision is made for the multiplexing device to have a control input, via which a control signal can be fed into the multiplexing device. In this case, the multiplexing device is designed such that it can selectively be switched by means of this control signal to a first switching state, in which the signal input of the transmission module and the control device are connected to one another, or to a second switching state, in which the signal input of the transmission module and the driver input of the driver are connected. Alternatively, or additionally, it is also possible to switch in the opposite direction.

According to another advantageous embodiment of the transmission module according to the invention, provision is made for the multiplexing device to automatically determine whether the input signal that is applied to the signal input of the transmission module is a programming signal for the control device or a transmission signal for the driver. If the input signal is a programming signal, then the multiplexing device automatically switches the input signal to the control device; in contrast, if the input signal is a transmission signal, then the multiplexing device automatically switches the input signal to the driver.

The multiplexing device preferably has a monitoring module, whose input side is connected directly or indirectly to the signal input of the transmission module. The monitoring module is used to identify the programming signals and the transmission signals, and to separate them from one another. In addition, the multiplexing device preferably has a multiplexing unit which is driven by the monitoring module via a control connection and is equipped with at least one input, two outputs and the already mentioned control connection. On the input side, the multiplexing unit is connected by means of these inputs to the signal input of the transmission module and on the output side, it is connected by means of these outputs on the one hand to the driver input of the driver and on the other hand to the control device. Depending on the control signals from the monitoring module, the multiplexing unit either connects the signal input of the transmission module to the driver input of the driver or, instead of this, connects it to the control device.

A line terminating impedance is preferably connected between the multiplexing unit and the signal input of the transmission module. A line terminating impedance such as this is advantageous particularly with respect to the transmission signals which are intended for the driver in order that they find a suitable or matching line terminating or characteristic impedance at the interface to the multiplexing device.

According to a further embodiment of the optical transmission module, provision is made for the for the impedance of the line terminating impedance to be controllable. This impedance control can be achieved, for example, via an impedance control input of the line terminating impedance, to which the monitoring module is connected in order to drive it. The monitoring module preferably drives the line terminating impedance such that it has an impedance which is suitable for transmission signals when a transmission signal is applied to the signal input of the transmission module. In a corresponding manner, the monitoring module sets the line terminating impedance to an impedance which is suitable for a programming signal when a programming signal is applied to the signal input of the transmission module.

By way of example, the monitoring module switches the line terminating impedance to have a high impedance, or disconnects it completely, when the input signal is a programming signal; this is because the programming signals are normally slow or low-frequency signals, which cannot drive normal line terminations.

According to a further embodiment of the transmission module, according to the invention, provision is made for the multiplexing device to have a pattern generator. The multiplexing device is in this case designed such that it connects the pattern generator to the driver when the signal input of the transmission module is connected to the control device. This refinement of the transmission module ensures that it is possible to match the transmission element and/or the driver: specifically, during a matching process such as this, it is necessary for the transmission element to be actively operated, and to produce optical output signals which can be measured and evaluated; at the same time, however, it must be possible to externally program the control device for the transmission module. In order to ensure this, the signal input of the transmission module is connected to the control device, so that programming signals can pass to the control device; at the same time, the transmission element is driven by the pattern generator, so that active operation of the transmission element is possible at the same time.

The pattern generator may, for example, generate a pseudo-random data sequence, which is passed as the transmission signal to the driver and thus to the transmission element.

In addition to the pattern generator, the multiplexing device preferably has at least two multiplexing units, a first of which is connected to the signal input of the transmission module and to the control device, while a second multiplexing unit is connected to the driver and to the pattern generator. A monitoring module in the multiplexing device drives the two multiplexing units such that a transmission signal which is applied to the signal input of the transmission module is passed through both multiplexing units to the driver. When, in contrast, a programming signal is applied to the signal input of the transmission module, then this is transmitted with the aid of the first multiplexing unit to the control device; in this case, the second multiplexing unit is used to connect the pattern generator to the driver, so that the transmission element can be operated, for example, with a pseudo-random data sequence.

According to a further advantageous embodiment of the optical transmission module according to the invention, this transmission module has a level detector, by means of which the multiplexing device measures the signal level—that is to say the magnitude, the signal amplitude or the signal power—of the input signal at the signal input of the transmission module. The multiplexing device uses the signal level that has been found to decide whether the input signal to the transmission module is a programming signal for the control device or, instead of this, a transmission signal for the transmission device. For example, the multiplexing device may regard the input signal as a programming signal when its signal level is greater than or less than a predetermined threshold level.

The level detector is preferably arranged in the already-described monitoring unit in the multiplexing device, which also contains a memory device for retaining or storing the signal evaluation result. The memory device may, for example, be formed by a flip-flop.

Alternatively, the multiplexing device may also have a frequency detector, by means of which it measures the frequency range of the input signal to the transmission module. The multiplexing device uses the frequency range of the input signal to determine whether the input signal is a transmission signal for the transmission device or, instead of this, is a programming signal for the control device. For example, the multiplexing device may regard the input signal as a programming signal when its frequency range is outside the frequency range that is typical for transmission signals. The typical frequency range is, for example, permanently stored in the multiplexing device.

According to another embodiment of the optical transmission module, provision is made for the multiplexing device to have a code detector, by means of which it evaluates the code sequences in the received signal which is applied to the signal input of the transmission module. The multiplexing device uses the code sequences which are found to determine whether this is a transmission signal or a programming signal. For example, the multiplexing device regards the input signal as a programming signal when its code sequences are not the same as typical or previously defined code sequences for transmission signals.

BRIEF DESCRIPTION OF THE DRAWINGS

In order to explain the invention.

DETAILED DESCRIPTION OF THE INVENTION

The same reference symbols are used for identical or comparable components in FIGS. 1 to 7.

Figure 1:
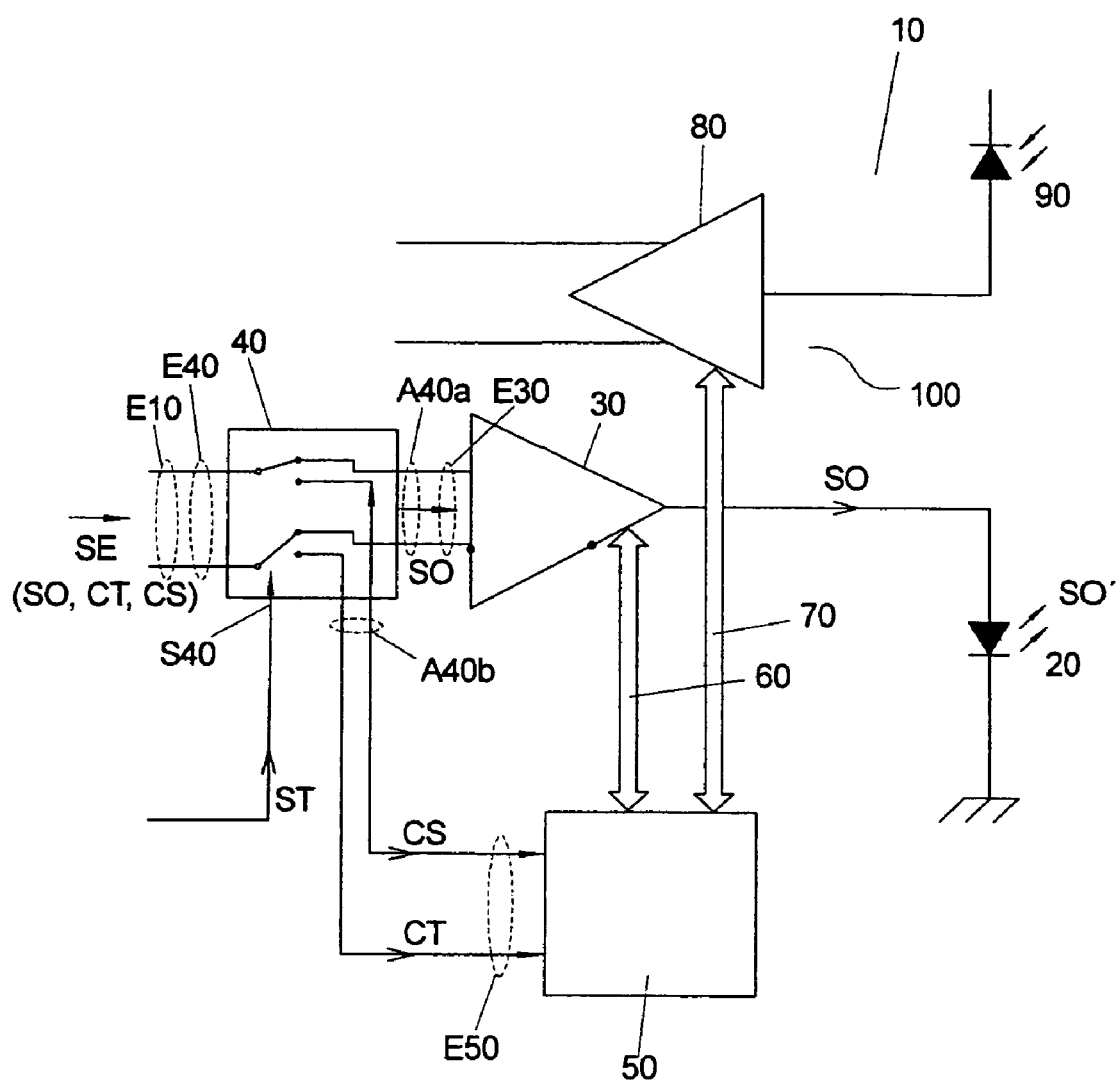
FIG. 1 shows a first exemplary embodiment of a transmission module according to the invention.

FIG. 1 shows a first exemplary embodiment of an optical transmission module 10 according to the invention. This shows a laser 20, which forms an optical transmission element and is driven by a driver 30, that is to say a laser driver.

A driver input E30 of the laser driver 30 is connected to a first output A40a of a multiplexing device 40. A second output A40b of the multiplexing device 40 is connected to a control device 50, which is connected via control lines 60 and 70 to the laser driver 30 and to a receiver circuit 80. The receiver circuit 80 is connected to a photodiode 90 which, together with the receiver circuit 80, forms a reception path 100 in the transmission module 10. The transmission module 10 is thus a transmission and reception module, and may, for example, be referred to as a "transceiver".

The function of the control device 50 is to drive the laser driver 30 and the receiver circuit 80 and to operate the laser driver 30 and the receiver circuit 80. The control device 50 is appropriately programmed for this purpose. As will be explained in the following text, the control device 50 is externally "reprogrammable", so that the operating program contained in the control device 50 can be amended or reprogrammed.

One input E40 of the multiplexing device 40 is connected to a signal input E10 of the transmission module 10. The expression signal input will in this case be regarded very widely; this is because any desired signals can be fed into the transmission module 10 via the signal input E10; for example, these may be differential signals, as is assumed by way of example in conjunction with the exemplary embodiments: the figures thus in each case show differential "two-wire" connections.

The multiplexing device 40 furthermore has a control input S40, via which a control signal ST can be fed into the multiplexing device 40. The multiplexing device 40 is designed such that the multiplexing device 40 can be switched by means of the control signal ST: FIG. 1 illustrates a situation in which the input E40 of the multiplexing device 40 is connected to the first output A40a of the multiplexing device 40 and thus to the driver input F30 of the laser driver 30. The control signal ST at the control input S40 can now be used to switch the multiplexing device 40 such that the input E40 of the multiplexing device 40 is connected to the second output A40b of the multiplexing device 40, and thus to an input E50 of the control device 50.

The transmission module 10 shown in FIG. 1 can be operated as follows: for a "normal" transmission mode, the multiplexing device 40 is set by means of the control signal ST at the control input S40 such that the transmission signals S0 which are applied to the signal input E10 of the transmission module 10 are passed via the multiplexing device 40 and the laser driver 30 to the laser 20, where they are emitted as optical transmission signals S0'. This setting of the multiplexing device 40 is, by way of example, the "normal setting" after starting up the transmission module 10 once again.

If it is now intended to reprogram or match the transmission module 10, then it is necessary to access the control device 50 within the transmission module 10. In the case of the transmission module 10, this is done via the multiplexing device 40 by applying a suitable control signal ST to the control input S40 in order to switch the multiplexing device 40 such that the input E40 of the multiplexing device 40 is now connected to the second output A40b of the multiplexing device 40, and is thus connected to the input E50 of the control device 50. Programming signals CS as well as a programming clock CT can now be transmitted from the input E10 of the transmission module 10 to the control device 50—or vice versa—via the input E40 of the multiplexing device 40 and via the signal input E10 of the transmission module 10, thus allowing the control device 50 to be reprogrammed.

As can be seen from FIG. 1, when the multiplexing device 40 has been switched, the laser driver 30 no longer receives any transmission signals at its driver input E30, so that the laser 20 does not operate.

Figure 2:
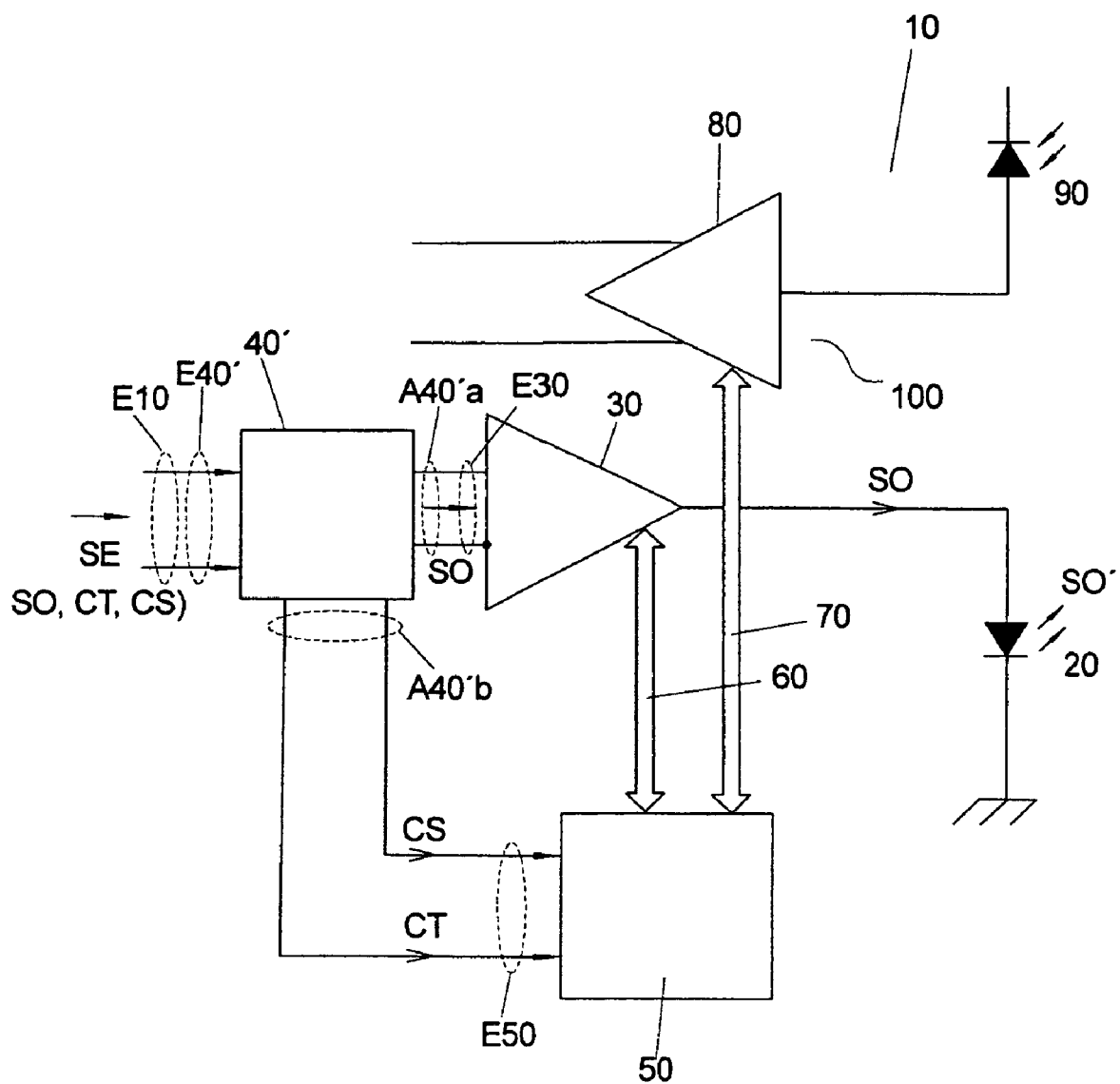
FIG. 2 shows a second exemplary embodiment of a transmission module according to the invention.

FIG. 2 shows a second exemplary embodiment of a transmission module according to the invention. The difference between the transmission module 10 shown in FIG. 2 and the transmission module 10 shown in FIG. 1 is the configuration of the multiplexing device 40' whose configuration is shown in FIG. 3 and whose method of operation will be explained in the following text in conjunction with FIGS. 4 and 5.

Figure 3:
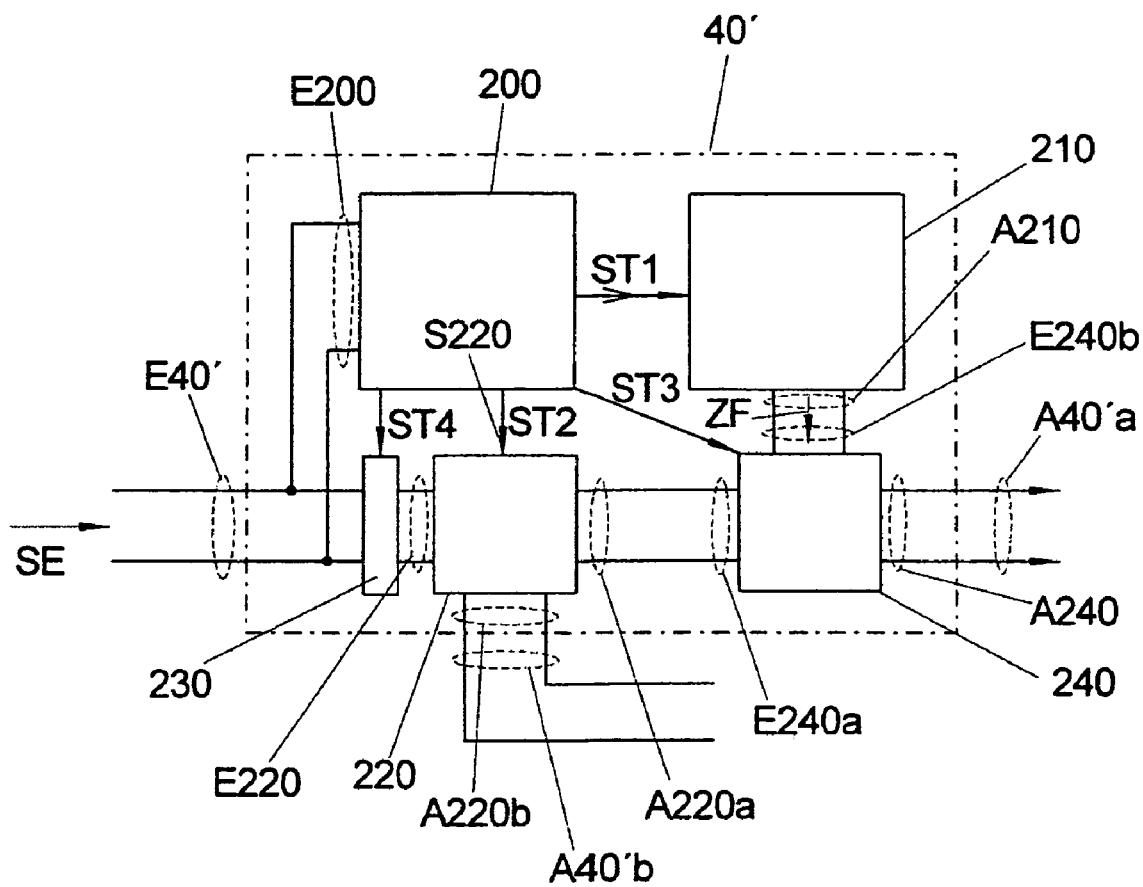
FIGS. 3, 4, 5 show the configuration and the method of operation of a multiplexing device for the transmission module shown in FIG. 2.

As can be seen from FIG. 3, the multiplexing device 40' has a monitoring module 200, which is connected to the input E40' of the multiplexing device 40' and thus to the input E10 of the transmission module 10. The object of the monitoring module 200 is to investigate the input signals SE which are applied to the signal input E10 of the transmission module 10 and to determine whether the input signal is a programming signal CS and a programming clock CT for the control device 50 or is a transmission signal S0 for the laser 20.

Furthermore, FIG. 3 shows a pattern generator 210 which is driven by means of a control signal ST1 from the monitoring module 200.

FIG. 3 also shows a first multiplexer unit 220, which is a 1×2 multiplexer. This means that the signals which are applied to an input E220 of the multiplexer unit 220 can selectively be switched to a first output A220a or to a second output A220b; once the respective link has been set up, bidirectional operation of the line connection is, of course, possible, so that signals can be transmitted in both directions.

The first multiplexer unit 220 is connected via a controllable line terminating impedance 230 to the signal input E10 of the transmission module 10. The first multiplexer unit 220 is driven via a control connection S220 from the monitoring unit 200.

The first output A220a of the first multiplexing unit 220 is connected to a first input E240a of a second multiplexing unit 240 whose second input E240b is connected to an output A210 of the pattern generator 210.

On the output side, that is to say by means of an output A240, the second multiplexing unit 240 is connected to the driver input E30 (of the laser driver 30), which is shown in FIG. 2.

The multiplexing device 40' shown in FIG. 3 is operated as follows:

First of all the input signal SE, which is applied to the input E10 of the transmission module 10 is analysed by the monitoring module 200. If the input signal SE is a transmission signal S0, for the laser driver 30 or for the laser 20, then the monitoring module 200 drives the first multiplexing unit 220 with a control signal ST2 such that it connects the input E220 to the first output A220a. The transmission signal S0 at the input E10 of the transmission module 10 is thus passed on to the input E240a of the second multiplexing unit 240.

The monitoring module 200 uses a control signal ST3 to drive the second multiplexing unit 240 such that the first input E240a and the output A240 of the second multiplexing unit 240 are connected. The transmission signal S0 is thus passed to the laser driver 30 and to the laser 20.

Figure 4:
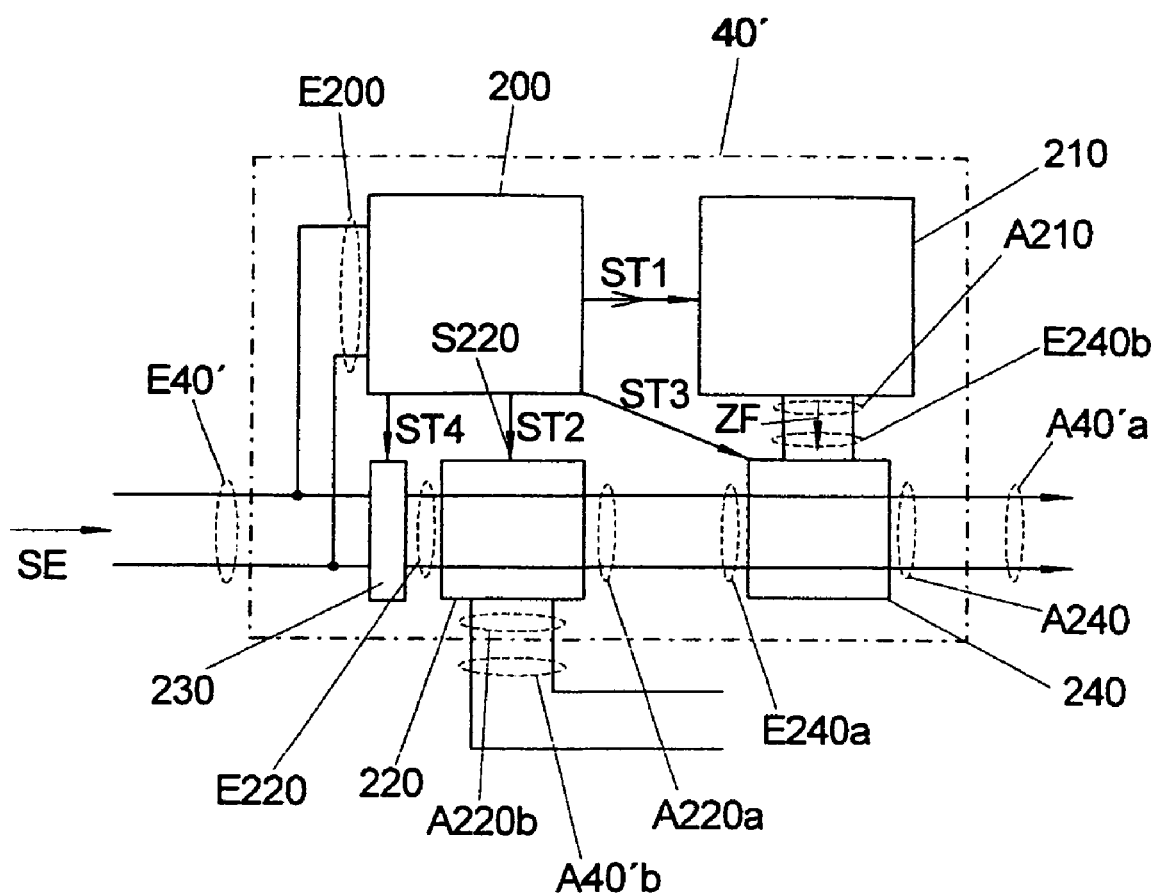
Figure 5:
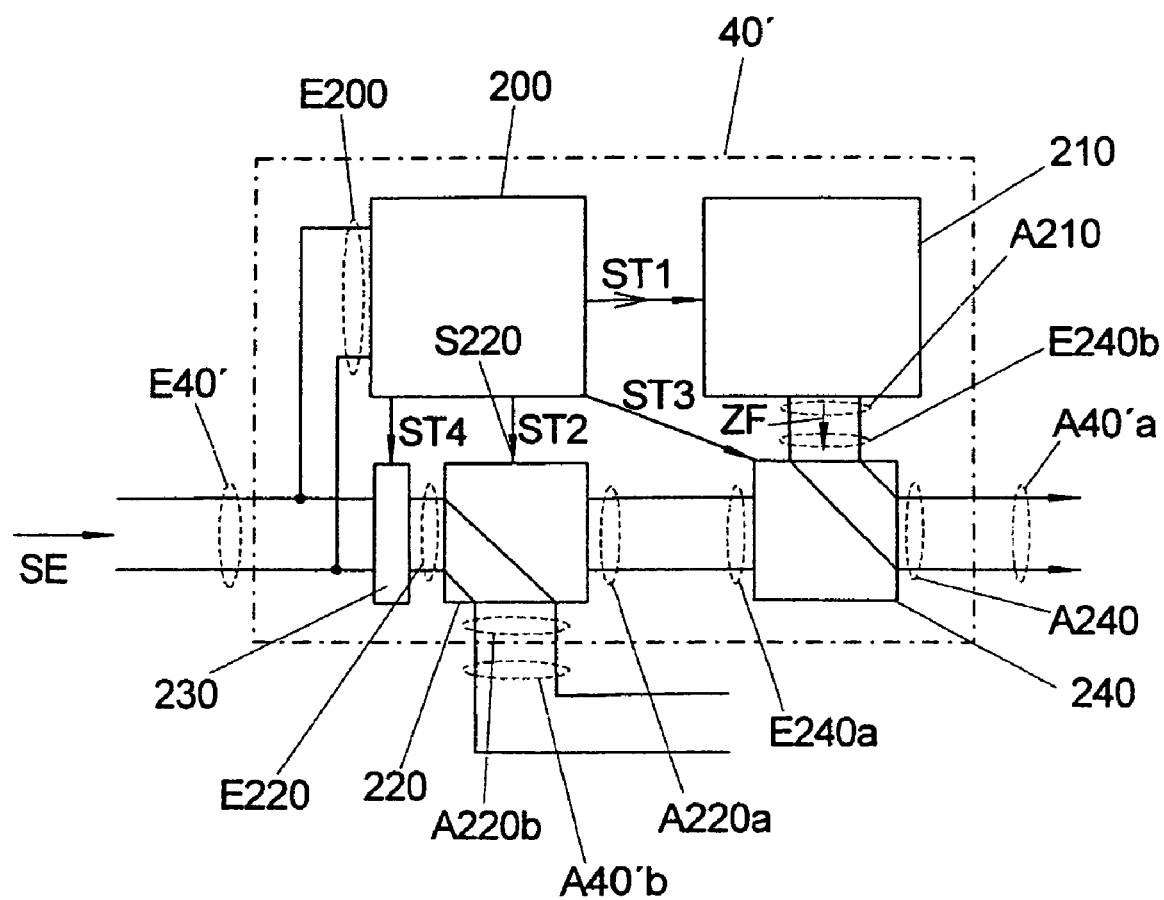

The complete signal profile of the transmission signal S0 is shown in FIG. 4.

In order to avoid signal reflections at the input E220 of the first multiplexing unit 220, the programmable line terminating impedance 230 is arranged between the first multiplexing unit 220 and the signal input E10, and is driven via a control signal ST4 such that the transmission signal SE as far as possible remains uncorrupted. The method of operation of the programmable line terminating impedance 230 will be explained further below in conjunction with FIG. 7.

If the input signal SE at the signal input E10 of the transmission module 10 is not the transmission signal S0, but, in contrast is a programming signal CS and/or a programming clock CT for the control device 50, then this is identified in an appropriate manner by the monitoring module 200.

In a situation such as this, the monitoring module 200 uses the two control signals ST2 and ST3 to drive the first multiplexing unit 220 as well as the second multiplexing unit 240 such that they each change their switching state. This is shown in detail in FIG. 5.

Overall, the input, E220 of the first multiplexer unit 220 is now connected to its second output A220b, so that the programming signal CS and the programming clock CT are connected directly to the control device 50.

The second multiplexing unit 240 is driven by the control signal ST3 from the monitoring module 200 such that its second input E240b is connected to the output A240; the pattern generator 210 is thus now connected to the laser driver 30 and to the laser diode 20 so that the pseudo-random data sequences ZF which are generated by the pattern generator 210 can be passed to the laser driver 30 and thus to the laser 20. The laser 20 is thus operated directly by the pattern generator.

Alternatively, the pattern generator 210 may also be controlled by the control device 50, for example, by programming specific bits for the control device 50. For example, this makes it possible to select a different pattern. Furthermore, the pattern generator 210 need not be arranged in the multiplexing device 40'; alternatively, the pattern generator 210 may also for example be integrated in the control device 50, or may be part of it.

The signal input E10 in the transmission module 10 can thus be used to transmit a programming signal CS and a programming clock CT to the control device 50.

Since the pattern generator 210 continues to operate the laser 20, the transmission module 20 can also be matched—contrasting the situation with the first exemplary embodiment shown in FIG. 1—specifically because laser operation of the laser 20 is nevertheless still permissible via the signal input E10 during the programming of the control device 50.

One exemplary embodiment of the control module 200 as shown in FIG. 4 will be described in conjunction with FIG. 6. As can be seen, the monitoring module 200 has a level detector 300, which is connected to the input E200 of the monitoring module 200, and thus to the signal input E10 of the transmission module 10 (see FIG. 3).

On the output side, the level detector 300 is connected to a memory device 310 in the form of an RS flip-flop. On the output side the RS flipflop 310 emits the control signals ST1, ST2, ST3 and ST4, which have already been explained, in order to drive the programmable line terminating impedance 230, the pattern generator 210 and the two multiplexing units 220 and 240. The flipflop, and thus the multiplexers, can thus be switched by, for example, a short trigger signal (a briefly applied specific level, a frequency burst or code). Once the programming has been completed, the multiplexers can be switched back again to the original state. Discrete time-control, rather than just continuous time-control, is thus possible.

The level detector 300 analyzes the signal level—that is to say the signal amplitude and/or the signal power—of the input signal SE, which is applied to the input E10 of the transmission module 10. If the signal level of the input signal SE is greater than or less than a predetermined level threshold (for example an amplitude threshold, a power threshold etc.), then the level detector 300 decides that the input signal SE is a programming signal CS or a programming clock CT. If, on the other hand, the signal level at the signal input E10 is within a level range which has been predetermined for transmission signals S0, then the level detector 300 decides that the input signal SE is a transmission signal S0 for the laser driver 30 and for the laser 20. The RS flipflop 310 is driven by the level detector 300 in an appropriate manner.

A frequency detector or a code detector may be used in a corresponding manner, instead of a level detector 300. If the frequency detector were used, this would measure the frequency range of the input signal SE of the input E10 of the transmission module 10, and would use the measured frequency range to decide to determine whether this input signal is a transmission signal S0 for the laser driver 30 and for the laser 20 or a programming signal CS for the control device 50. This decision may be made, for example, by comparing the measured frequency range Fmeas with frequency range Ftyp, which is typical of transmission signals S0.

Figure 6:
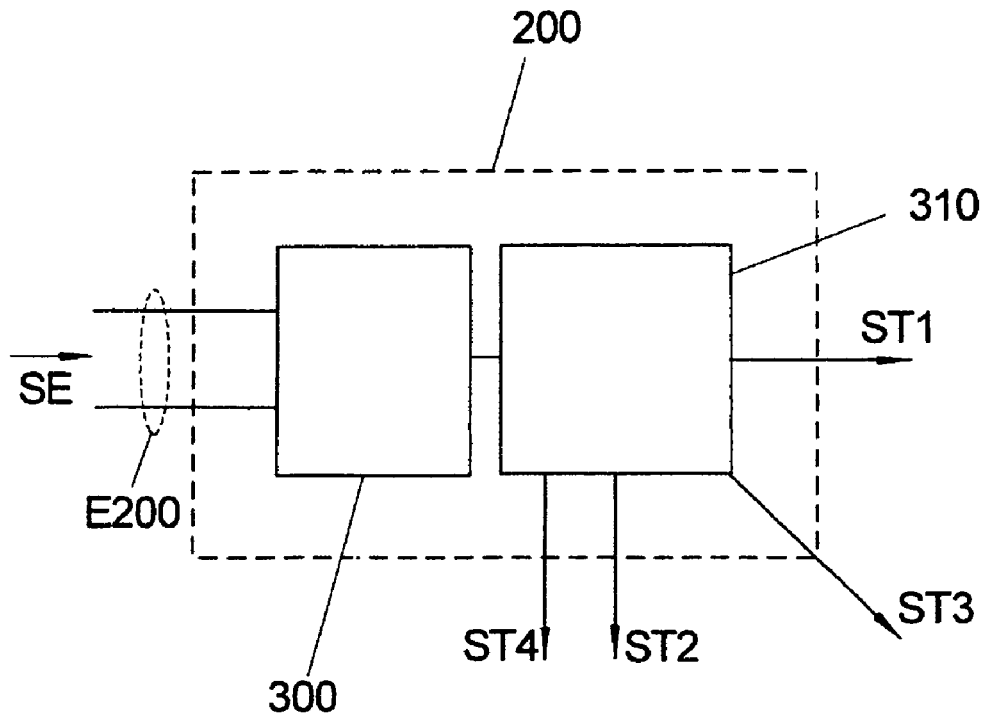
FIG. 6 shows an exemplary embodiment of a monitoring module for the multiplexing device shown in FIG. 3.

Alternatively, instead of the level detector 300 shown in FIG. 6, it is also possible to use a code detector, which evaluates the code sequences at the signal input E10, uses the code sequences which are found to decide whether the signal is a transmission signal S0 for the laser 20, or is a programming signal CS for the control device 50.

Figure 7:
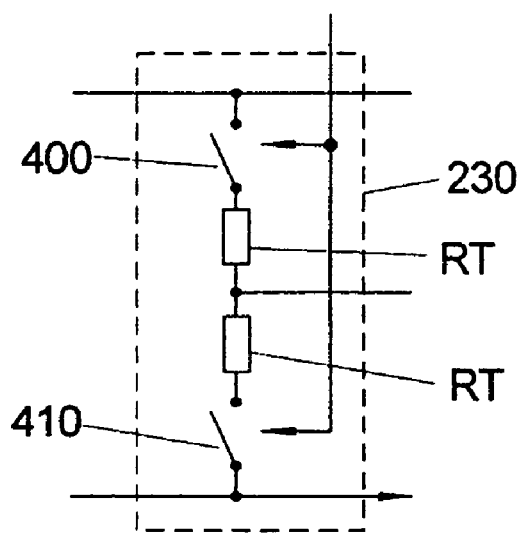
FIG. 7 shows an exemplary embodiment of a line terminating impedance, as is shown for the exemplary embodiment in FIG. 2.

FIG. 7 shows an exemplary embodiment of a programmable line terminating impedance 230. As can be seen, the line terminating impedance 230 has two impedances RT, which can be connected via a respective switch 400 or 410 to the signal input E10 of the transmission module 10. The two impedances RT are connected to one another by means of the respective other connection, and are connected to a predetermined bias voltage, for example, the ground potential.

LIST OF REFERENCE SYMBOLS

10 Transmission module
20 Laser
30 Laser driver
40 Multiplexing device
50 Control device
60, 70 Control lines
80 Receiving circuit
90 Photo diode
200 Monitoring module
210 Pattern generator
220 First multiplexing unit
230 Line terminating impedance
240 Second multiplexing unit
300 Level detector
310 RS flip-flop
400, 410 Switches
ST, ST1,
ST2, ST3 ST4 Control signals
ZF Pseudo-random data signals
CS Programming signals
CT Programming clock
S0 Transmission signal for the laser

The invention claimed is:

1. An optical transmission module, comprising:
an optical transmission element;
a driver comprising a driver input configured to drive the optical transmission element in response to a transmission signal applied to the driver input to produce a drive signal for the optical transmission element
a programmable control device configured to selectively drive the driver in a program mode of operation; and
a multiplexing device connected between a signal input of the transmission module, the driver input and the programmable device, and configured to selectively pass an input signal at the signal input of the transmission module to the control device in the program mode or to the driver in a transmission mode of operation, wherein the multiplexing device is configured to determine whether the input signal applied to the signal input of the transmission module is a programming signal for the programmable control device or a transmission signal for the driver, and wherein the multiplexing device is configured to switch the input signal automatically to the programmable control device if the input signal is a programming signal, or switch the input signal to the driver if the input signal is a transmission signal, and wherein the multiplexing device comprises:
a monitoring module comprising an input connected directly or indirectly to the signal input of the transmission module and configured to identify programming signals and transmission signals in each case; and
a multiplexing unit coupled to and driven by the monitoring module via a control connection and comprising at least one input, two outputs and the control connection, wherein the multiplexing unit is connected directly or indirectly at the input to the signal input of the transmission module and at the output to the driver input of the driver and to the programmable control device, respectively, and wherein the multiplexing unit is configured to connect the signal input of the transmission module to the driver input of the driver or to the control device as a function of a control signal from the monitoring module; and
a line terminating impedance arranged between the multiplexing unit and the signal input of the transmission module.

2. The optical transmission module as claimed in claim 1, wherein an impedance of the line terminating impedance is configured to be controlled to differing values.

3. The optical transmission module as claimed in claim 2, wherein the line terminating impedance comprises an impedance control input connected to the monitoring module.

4. The optical transmission module as claimed in claim 3, wherein the monitoring module controls the line terminating impedance to an impedance value that is suitable for transmission signals when a transmission signal is applied to the signal input of the transmission module in the transmission mode, and to an impedance value that is suitable for a programming signal when a programming signal is applied to the signal input of the transmission module in a program mode of operation.

5. The optical transmission module as claimed in claim 4, wherein the monitoring module is configured to switch the line terminating impedance to a high impedance value when a programming signal is applied to the signal input of the transmission module in the program mode.

6. An optical transmission module, comprising:
   an optical transmission element;
   a driver comprising a driver input configured to drive the optical transmission element in response to a transmission signal applied to the driver input to produce a drive signal for the optical transmission element;
   a programmable control device configured to selectively drive the driver in a program mode of operation;
   a multiplexing device connected between a signal input of the transmission module, the driver input and the programmable control device, and configured to selectively pass an input signal at the signal input of the transmission module to the control device in the program mode or to the driver in a transmission mode of operation; and
   a pattern generator, and wherein the multiplexing device is configured to connect the pattern generator to the driver when the signal input of the transmission module is connected to the control device in the program mode.

7. The optical transmission module as claimed in claim 6, wherein the multiplexing device comprises a control input via which a control signal is fed into the multiplexing device, and wherein the multiplexing device is configured to switch in response to the control signal from a switching state that connects the signal input from the transmission module and the programmable control device in the program mode, to a switching state that connects the signal input of the transmission module and the driver input of the driver in the transmission mode, or vice versa.

8. The optical transmission module as claimed in claim 6, wherein the multiplexing device is configured to determine whether the input signal that is applied to the signal input of the transmission module is a programming signal for the control device or is a transmission signal for the driver, and wherein the multiplexing device switches the input signal automatically to the control device if the input signal is a programming signal, and switched it to the driver if the input signal is a transmission signal.

9. The optical transmission module as claimed in claim 8, wherein the multiplexing device comprises:
   a monitoring module comprising an input connected directly or indirectly to the signal input of the transmission module and configured to identify programming signals and transmission signals; and
   a first multiplexing unit coupled to and driven by the monitoring module via a control connection and comprising at least one input, two outputs and the control connection, wherein the first multiplexing unit is connected directly or indirectly at the input to the signal input of the transmission module and at the output to the driver input of the driver and to the programmable control device, and wherein the first multiplexing unit is configured to connect the signal input of the transmission module to the driver input of the driver or to the control device as a fUnction of a control signal from the monitoring module.

10. The optical transmission module as claimed in claim 9, wherein the multiplexing device further comprises a second multiplexing unit with at least two signal inputs, one signal output and one control connection, wherein one of the two signal inputs of the second multiplexing unit is connected directly or indirectly to that output of the first multiplexing unit that is associated with the driver, the other of the two signal inputs of the second multiplexing unit is connected directly or indirectly to the pattern generator, the signal output of the second multiplexing unit is connected directly or indirectly to the driver, the control connection of the second multiplexing unit is connected directly or indirectly to the monitoring module, and wherein the monitoring module is configured to drive the second multiplexing unit such that the output signals from the pattern generator are passed to the driver if the signal input of the transmission module and programmable control device are connected to the first multiplexing unit.

11. An optical transmission module, comprising:
   a optical transmission element
   a driver comprising a driver input configured to drive the optical transmission element in response to a transmission signal applied to the driver input to produce a drive signal for the optical transmission element;
   a programmable control device configured to selectively drive the driver in a program mode of operation; and
   a multiplexing device connected between a signal input of the transmission module, the driver input and the programmable control device, and configured to selectively pass an input signal at the signal input of the transmission module to the control device in the program mode or to the driver in a transmission mode of operation, wherein the multiplexing device is configured to determine whether the input signal applied to the signal input of the transmission module is a programming signal for the programmable control device or a transmission signal for the driver, p1 wherein the multiplexing device is configured to switch the input signal automatically to the programmable control device if the input signal is a programming signal, or switch the input signal to the driver if the input signal is a transmission signal, wherein the multiplexing device comprises a level detector configured to measure a signal level of the input signal at the signal input of the transmission module,
   wherein the multiplexing device is configured to determine whether the input signal is a transmission signal for the transmission device or a programming signal for the control device based on an evaluation of the measured signal level,
   wherein the multiplexing device is configured to regard the input signal applied to the signal input of the transmission module as a programming signal when the signal level is greater than or less than a predetermined threshold level, and
   wherein the level detector is arranged in a monitoring unit in the multiplexing device, and wherein the monitoring unit comprises a memory device configured to store the results of the signal evaluation.

12. The optical transmission module as claimed in claim 11, wherein the memory device comprises a flip-flop.

* * * * *

UNITED STATES PATENT AND TRADEMARK OFFICE
CERTIFICATE OF CORRECTION

| | |
|---|---|
| PATENT NO. | : 7,489,877 B2 |
| APPLICATION NO. | : 10/849198 |
| DATED | : February 10, 2009 |
| INVENTOR(S) | : Karl Schrodinger |

It is certified that error appears in the above-identified patent and that said Letters Patent is hereby corrected as shown below:

Column 8, Line 13, Claim 1, delete "element" and insert --element;--.

Column 8, Line 18, Claim 1, delete "device," and insert --control device,--.

Column 9, Line 57, Claim 9, delete "fUnction" and insert --function--.

Column 10, Line 18, Claim 11, delete "a optical" and insert --an optical--.

Column 10, Line 18, Claim 11, delete "element" and insert --element;--.

Column 10, Line 35, Claim 11, after "driver," delete "p1".

Column 10, Lines 39-42, Claim 11, delete "driver if the input signal is a transmission signal, wherein the multiplexing device comprises a level detector configured to measure a signal level of the input signal at the signal input of the transmission module," and insert --driver if the input signal is a transmission signal,
wherein the multiplexing device comprises a level detector configured to measure a signal level of the input signal at the signal input of the transmission module,--.

Signed and Sealed this

Twenty-first Day of December, 2010

David J. Kappos
*Director of the United States Patent and Trademark Office*